(12) United States Patent
Tong et al.

(10) Patent No.: US 12,069,724 B2
(45) Date of Patent: Aug. 20, 2024

(54) COMMUNICATION DEVICE, METHOD AND SYSTEM FOR ADJUSTING NETWORK ALLOCATION VECTOR OF COMMUNICATION DEVICE, AND ELECTRONIC DEVICE

(71) Applicant: TP-Link Corporation Limited, Hong Kong (CN)

(72) Inventors: Di Tong, Guangdong (CN); Changqiang Wu, Guangdong (CN)

(73) Assignee: TP-Link Corporation Limited, Hong Kong (CN)

( * ) Notice: Subject to any disclaimer, the term of this patent is extended or adjusted under 35 U.S.C. 154(b) by 130 days.

(21) Appl. No.: 17/970,606

(22) Filed: Oct. 21, 2022

(65) Prior Publication Data

US 2023/0126049 A1 Apr. 27, 2023

(30) Foreign Application Priority Data

Oct. 27, 2021 (CN) .......................... 202111255738.9

(51) Int. Cl.
*H04W 74/0808* (2024.01)
(52) U.S. Cl.
CPC .............................. *H04W 74/0808* (2013.01)
(58) Field of Classification Search
CPC .. H04W 74/0808; H04W 76/00; H04W 74/00
See application file for complete search history.

(56) References Cited

U.S. PATENT DOCUMENTS 10,492,221 B1 * 11/2019 Chu ....................... E21B 47/06
2010/0074198 A1 * 3/2010 Morioka ........... H04W 74/0816
370/329

(Continued)

FOREIGN PATENT DOCUMENTS

CN 1842001 A 10/2006
CN 102695286 A 9/2012

(Continued)

OTHER PUBLICATIONS

Vivo, R1-2005372, Discussion on channel access mechanism, 3GPP TSG RAN WG1 #102e, e-Meeting, Aug. 17-28, 2020.

(Continued)

*Primary Examiner* — Siren Wei
(74) *Attorney, Agent, or Firm* — Samson G. Yu (57) ABSTRACT

The present disclosure discloses a method for adjusting network allocation vector of a communication device, including: after receiving an RTS frame or a CTS frame transmitted in a case that a wireless access point establishes an RTS/CTS mechanism with a target communication device correspondingly, setting the network allocation vector according to the RTS frame or the CTS frame; determining a receiving situation of the RTS frame or the CTS frame; in a case that the receiving situation satisfies a pre-reset condition which is preset, acquiring an MAC frame received within network allocation vector time; and in a case that a transmitter address and a receiver address of the MAC frame satisfy an establishment failure condition for the RTS/CTS mechanism which is preset, resetting the network allocation vector. Embodiments of the present disclosure further disclose a communication device, a system and an electronic device.

11 Claims, 4 Drawing Sheets

(56) References Cited

U.S. PATENT DOCUMENTS

| | | |
|---|---|---|
| 2011/0317630 A1 | 12/2011 | Zhu et al. |
| 2013/0070668 A1 | 3/2013 | Merlin et al. |
| 2017/0041798 A1 | 2/2017 | Li et al. |
| 2018/0084579 A1* | 3/2018 | Tian .................. H04W 74/0816 |

FOREIGN PATENT DOCUMENTS

| | | |
|---|---|---|
| CN | 103828470 A | 5/2014 |
| CN | 106550478 A | 3/2017 |
| WO | 2017050137 A1 | 3/2017 |

OTHER PUBLICATIONS

Vulnerabilities analysis of RTS/CTS mechanism in 802.11 protocols.

* cited by examiner

Fig. 7

COMMUNICATION DEVICE, METHOD AND SYSTEM FOR ADJUSTING NETWORK ALLOCATION VECTOR OF COMMUNICATION DEVICE, AND ELECTRONIC DEVICE

CROSS-REFERENCE TO RELATED APPLICATION

The present disclosure claims the priority of Chinese Patent Application No. 202111255738.9, filed to the China National Intellectual Property Administration on Oct. 27, 2021 and entitled "Communication device, Method and System for Adjusting Network Allocation Vector of Communication device, and Electronic Device", which is incorporated herein its entirety by reference.

TECHNICAL FIELD

The present disclosure relates to the technical field of wireless communication, and in particular, to a communication device, a method and a system for adjusting a network allocation vector of a communication device, and an electronic device.

BACKGROUND

An RTS/CTS mechanism is a mechanism which is used in a 802.11 wireless network protocol to reduce collisions caused by hidden node problems, and the mechanism mainly protects the channel transmission of a target communication device from being interfered by other communication devices by means of setting a Duration/ID field of an RTS/CTS frame to be a duration in which the target communication device uses a channel subsequently. For example, when the other communication devices monitor the RTS/CTS frame, the other communication devices will set their own NAV (Network Allocation Vector) time according to the RTS/CTS frame, so as to ensure that the other communication devices cannot initiate any action to compete for the channel within the NAV time.

At present, the mechanism has the following problems: when the RTS/CTS mechanism is not successfully established, the other communication devices can only initiate actions to compete for the channel after waiting for the end of the NAV time, such that the other communication devices lose the opportunity to compete for the channel. For example, when a wireless access point successfully receives an RTS frame, the wireless access point replies a CTS frame to the target communication device, at this time, the target communication device does not successfully analyze the CTS frame due to other interference, which indicates that the RTS/CTS mechanism is not successfully established. However, the other communication devices, which receive the CTS frame, successfully analyze the CTS frame, and thus can only initiate actions to compete for the channel after waiting for the end of the NAV time, which are set according to the CTS frame, resulting in an unnecessary waiting time.

SUMMARY

The purpose of the embodiments of the present disclosure is to provide a communication device, a method and a system for adjusting a network allocation vector of a communication device, and an electronic device.

To achieve the above purpose, the embodiments of the present disclosure provide a method for adjusting a network allocation vector of a communication device, including:
after receiving an RTS frame or a CTS frame transmitted in a case that a wireless access point establishes an RTS/CTS mechanism with a target communication device correspondingly, an network allocation vector is set according to the RTS frame or the CTS frame;
a receiving situation of the RTS frame or the CTS frame is determined;
in a case that the receiving situation satisfies a pre-reset condition which is preset, an MAC frame received within network allocation vector time is acquired; and
in a case that a transmitter address and a receiver address of the MAC frame satisfy an establishment failure condition for the RTS/CTS mechanism which is preset, the network allocation vector is reset.

As an improvement of the above solution, the establishment failure condition for the RTS/CTS mechanism is: the transmitter address is the wireless access point, and the receiver address is not the target communication device.

As an improvement of the above solution, the method further includes:
in a case that the receiving situation does not satisfy the pre-reset condition, the network allocation vector is maintained unchanged.

As an improvement of the above solution, the pre-reset condition includes one of the following:
the RTS frame is received, and the RTS frame is an RTS frame transmitted by the target communication device to the wireless access point;
the RTS frame is received, and the RTS frame is an RTS frame transmitted by the wireless access point to the target communication device; and
only the CTS frame is received, and the CTS frame is a CTS frame transmitted by the wireless access point to the target communication device.

As an improvement of the above solution, the MAC frame includes one of the following: a data frame, a control frame, and a management frame.

To achieve the above purpose, the embodiments of the present disclosure further provide a communication device, including:
a network allocation vector setting module configured to, after receiving an RTS frame or a CTS frame transmitted in a case that a target communication device establishes an RTS/CTS mechanism with a wireless access point, set a network allocation vector according to the RTS frame or the CTS frame;
a receiving situation determining module, configured to determine a receiving situation of the RTS frame or the CTS frame;
an MAC frame acquisition module configured to, in a case that the receiving situation satisfies a pre-reset condition which is preset, acquire an MAC frame received within network allocation vector time; and
a network allocation vector reset module, configured to, in a case that a transmitter address and a receiver address of the MAC frame satisfy an establishment failure condition for the RTS/CTS mechanism which is preset, reset the network allocation vector.

As an improvement of the above solution, the establishment failure condition for the RTS/CTS mechanism is: the transmitter address is the wireless access point, and the receiver address is not the target communication device.

As an improvement of the above solution, the pre-reset condition includes one of the following:

the RTS frame is received, and the RTS frame is an RTS frame transmitted by the target communication device to the wireless access point;

the RTS frame is received, and the RTS frame is an RTS frame transmitted by the wireless access point to the target communication device; and only the CTS frame is received, and the CTS frame is a CTS frame transmitted by the wireless access point to the target communication device.

To achieve the above purpose, the embodiments of the present disclosure further provide an electronic device, including a processor, a memory, and a computer program that is stored in the memory and is configured to be executed by the processor, and in a case that executing the computer program, the processor implements the method for adjusting the network allocation vector of the communication device according to any one of the above items.

To achieve the above purpose, the embodiments of the present disclosure further provide a system for adjusting a network allocation vector, including: at least two communication devices and a wireless access point, and there is at least one of the communication device above in the at least two communication devices.

Compared with the prior art, the communication device, the method and the system for adjusting the network allocation vector of the communication device, and the electronic device provided by the embodiments of the present disclosure have the advantages that: the own network allocation vector of the communication device is adjusted according to the receiving situation of the received RTS frame or the CTS frame, and the transmitter address and the receiver address of the received MAC frame, so as not to miss the opportunity to compete for a channel and avoid unnecessary waiting time. Therefore, by means of the embodiments of the present disclosure, the own network allocation vector can be adjusted reasonably and effectively, such that the communication device can compete for the channel more effectively, thereby improving the network throughput.

DETAILED DESCRIPTION OF THE EMBODIMENTS

A clear and complete description of technical solutions in the embodiments of the present disclosure will be given below, in combination with the drawings in the embodiments of the present disclosure. Apparently, the embodiments described below are merely a part, but not all, of the embodiments of the present disclosure. All of other embodiments, obtained by those of ordinary skill in the art based on the embodiments in the present disclosure without any creative effort, fall into the protection scope of the present disclosure.

Figure 1:
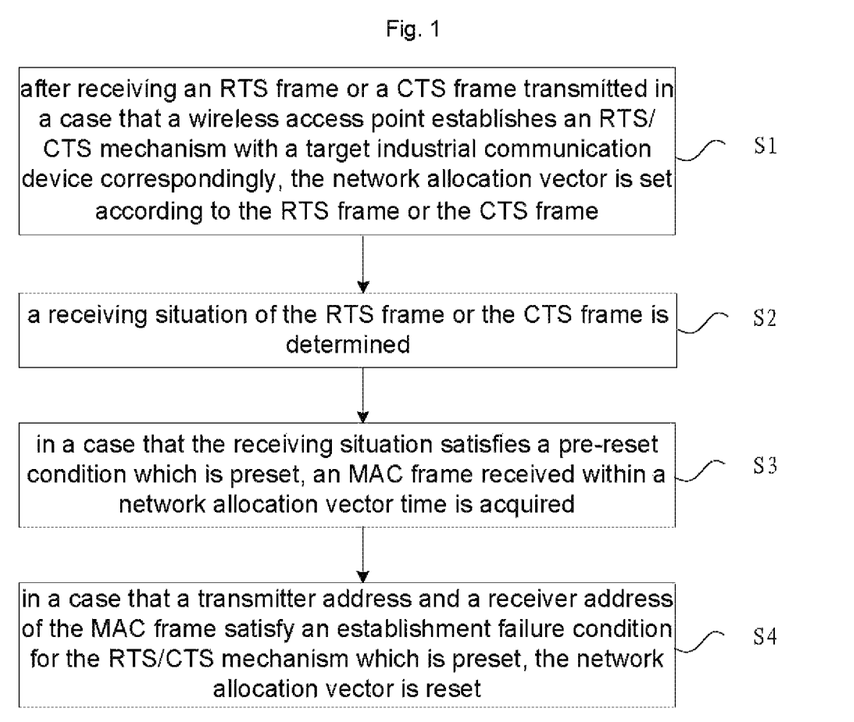
FIG. 1 is a flow diagram of a method for adjusting a network allocation vector of a communication device according to an embodiment of the present disclosure.

Referring to FIG. 1, FIG. 1 is a flow diagram of a method for adjusting a network allocation vector of a communication device according to an embodiment of the present disclosure. The method for adjusting a network allocation vector of the communication device includes:

S1. after receiving an RTS frame or a CTS frame transmitted in a case that a wireless access point establishes an RTS/CTS mechanism with a target communication device correspondingly, the network allocation vector is set according to the RTS frame or the CTS frame;

S2. a receiving situation of the RTS frame or the CTS frame is determined;

S3. in a case that the receiving situation satisfies a pre-reset condition which is preset, an MAC frame received within network allocation vector time is acquired; and S4. in a case that a transmitter address and a receiver address of the MAC frame satisfy an establishment failure condition for the RTS/CTS mechanism which is preset, the network allocation vector is reset.

It should be noted that, in the embodiment of the present disclosure, the communication device, the wireless access point and the target communication device correspondingly all perform communication in the same infrastructure BSS.

In another preferred embodiment, the method further includes:

In a case that the receiving situation does not satisfy the pre-reset condition, the network allocation vector is maintained unchanged.

Specifically, the pre-reset condition includes one of the following:

the RTS frame is received, and the RTS frame is an RTS frame transmitted by the target communication device to the wireless access point;

the RTS frame is received, and the RTS frame is an RTS frame transmitted by the wireless access point to the target communication device; and only the CTS frame is received, and the CTS frame is a CTS frame transmitted by the wireless access point to the target communication device.

Figure 2:
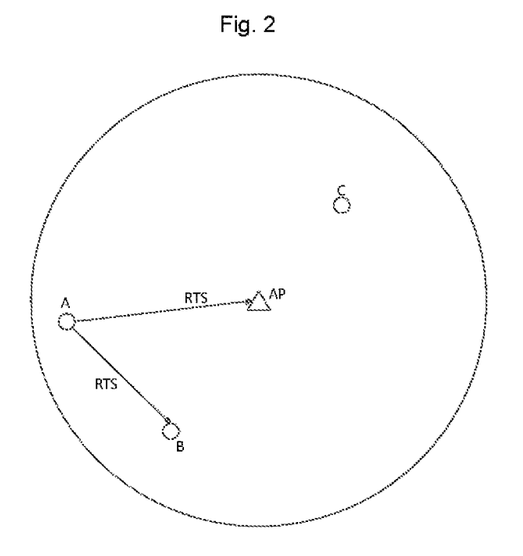
FIG. 2 is a schematic diagram of a receiving situation of an RTS frame provided by an embodiment of the present disclosure.

It can be understood that the receiving situation includes four situations:

(1) the RTS frame is received, and the RTS frame is the RTS frame transmitted by the target communication device to the wireless access point.

Exemplarily, as shown in FIG. 2, an infrastructure BSS includes a wireless access point AP, a target communication device A, a communication device B and a communication device C, and the communication device C is a hidden node of the target communication device.

In a case that the target communication device A transmits the RTS frame to the wireless access point AP, one of the following situations occur: ① the wireless access point AP does not reply the CTS frame to the target communication device A, for example, the RTS frame transmitted by the target communication device A collides with the frame transmitted by the communication device C to the wireless access point AP, such that the wireless access point AP does not successfully analyze the RTS frame, and thus the wireless access point AP does not reply the CTS frame to the target communication device A. This situation may cause the communication device B that receives the RTS frame to think that the RTS/CTS mechanism is successfully established. ② The wireless access point AP replies the CTS frame to the target communication device A, but the target communication device A does not successfully receive the CTS frame due to interference, and the communication device B successfully receives the CTS frame. This situation can cause the communication device B that receives the RTS frame and the CTS frame to think that the RTS/CTS mechanism is successfully established. In a case that the communication device B thinks that the RTS/CTS mechanism is successfully established, the communication device B will set its own network allocation vector according to the received RTS frame transmitted by the target communication device A to the wireless access point AP, and at this time, the communication device B will not compete for the channel within the NAV time, thereby losing the opportunity to compete for the channel.

It can be understood that, for the above situation ①, according to the stipulations of the 802.11 wireless network protocol, in a case that the communication device B uses the information of the received RTS frame as the latest NAV update source, the communication device B will reset its own NAV according to the following situation: in a case that the communication device B does not receive a PHY-RXSTART. indication primitive within an NAV timeout period after receiving the RTS frame, the communication device B is allowed to reset its own NAV.

Therefore, in the embodiment of the present disclosure, in a case that the communication device B receives a new PHY-RXSTART. indication primitive within the NAV timeout period, and the received frame is a frame of which the transmitter address is the wireless access point AP and the receiver address is not the communication device A, it indicates that the RTS/CTS mechanism fails to be established, then the communication device B resets its own NAV, at this time, the communication device B can reset its own NAV before the NAV timeout period expires, thus shortening the waiting time. It should be noted that, if the communication device B receives the new PHY-RXSTART. indication primitive within the NAV timeout period, but does not reset its own NAV, then the communication device B cannot compete for the channel within the Duration of the entire RTS frame, thereby losing the opportunity to compete for the channel within this entire period of time.

It can be understood that, for the above situation ②, since the wireless access point AP replies the CTS frame, and the communication device B successfully receives the CTS frame, at this time, the communication device B will mistakenly think that the RTS/CTS mechanism is successfully established, and the communication device B will not compete for the channel within the NAV time that is set on the basis of the RTS frame, thereby losing the opportunity to compete for the channel.

Therefore, in the embodiment of the present disclosure, in a case that the communication device B receives a frame within the NAV time set by itself, in which the transmitter address is the wireless access point AP and the receiver address is not the target communication device A, it indicates that the RTS/CTS mechanism is not successfully established this time, and the communication device B resets its own NAV.

To sum up, in the embodiment of the present disclosure, in the case that the receiving situation is that the RTS frame is received and the RTS frame is an RTS frame transmitted by the target communication device to the wireless access point, that is, the receiving situation satisfies the pre-reset condition which is preset, the MAC frame received within the network allocation vector time is acquired; and in the case that the transmitter address and the receiver address of the MAC frame satisfy the establishment failure condition for the RTS/CTS mechanism which is preset, the network allocation vector is reset. It can be understood that, even if the Duration carried by the current MAC frame is less than its current NAV value, the network allocation vector can be reset, that is, the own NAV is set according to the currently received MAC frame. It should be noted that the NAV value will continue to decrease over time, therefore, the current NAV value refers to an NAV value in the case that the MAC frame is received.

Figure 3:
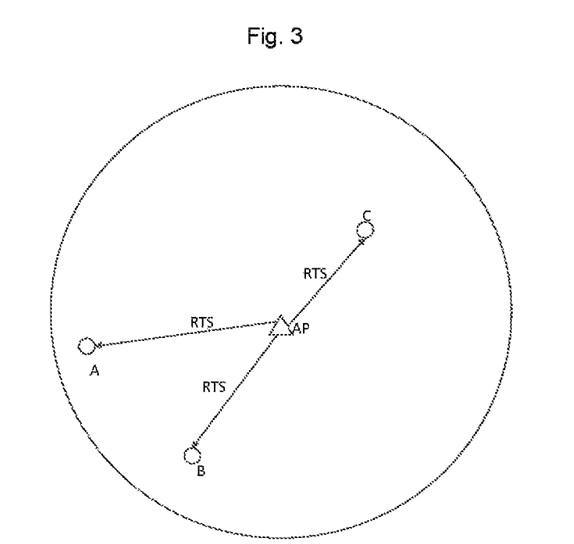
FIG. 3 is a schematic diagram of a receiving situation of another RTS frame provided by an embodiment of the present disclosure.

(2) The RTS frame is received, and the RTS frame is an RTS frame transmitted by the wireless access point to the target communication device.

Exemplarily, as shown in FIG. 3, an infrastructure BSS includes a wireless access point AP, a target communication device A, a communication device B and a communication device C, and the communication device C is a hidden node of the target communication device.

In a case that the wireless access point AP transmits the RTS frame to the communication device A, the communication device A replies the CTS frame to the wireless access point AP, but the wireless access point AP does not successfully receive the CTS frame due to interference, and the communication device B successfully receives the CTS frame. This situation will cause the communication device B that receives the RTS frame and the CTS frame to think that the RTS/CTS mechanism is successfully established, and the communication device B sets its own network allocation vector according to the received RTS frame that is transmitted by the wireless access point AP to the target communication device A. At this time, the communication device B will not compete for the channel within the NAV time, thereby losing the opportunity to compete for the channel.

Therefore, in the embodiment of the present disclosure, in a case that the receiving situation is that the RTS frame is received and the RTS frame is an RTS frame transmitted by the wireless access point to the target communication device, that is, the receiving situation satisfies the pre-reset condition which is preset, the MAC frame received within the network allocation vector time is acquired; and in a case that the transmitter address and the receiver address of the MAC frame satisfy the establishment failure condition for the RTS/CTS mechanism which is preset, the network allocation vector is reset. It can be understood that, even if the Duration carried by the current MAC frame is less than its current NAV value, the network allocation vector can be reset, that is, the own NAV is set according to the currently received MAC frame. It should be noted that the NAV value will continue to decrease over time, therefore, the current NAV value refers to an NAV value in a case that the MAC frame is received.

Figure 4:
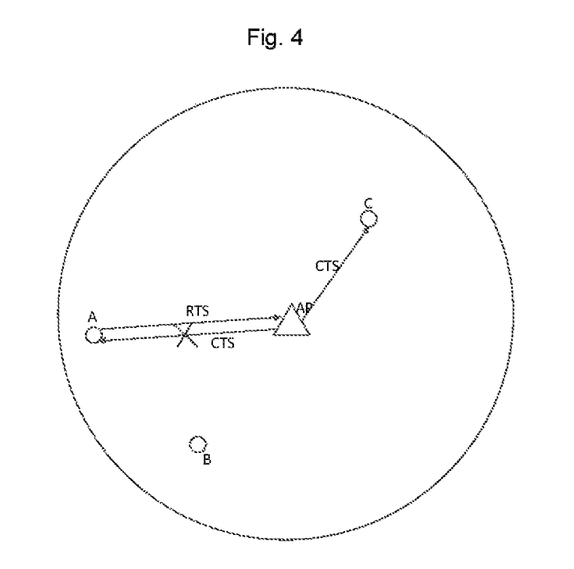
FIG. 4 is a schematic diagram of a receiving situation of a CTS frame provided by an embodiment of the present disclosure.

(3) Only the CTS frame is received, and the CTS frame is a CTS frame transmitted by the wireless access point to the target communication device.

Exemplarily, as shown in FIG. 4, an infrastructure BSS includes a wireless access point AP, a target communication device A, a communication device B and a communication device C, and the communication device C is a hidden node of the target communication device.

In a case that the target communication device A transmits the RTS frame to the wireless access point AP, the wireless access point AP receives the RTS frame and replies the CTS frame to the target communication device A, at this time, the target communication device A does not successfully receive the CTS frame, but the communication device C successfully receives the CTS frame, and the communication device C will set its own network allocation vector according to a Duration field carried by the CTS frame, that is, the communication device C will not compete for the channel within the NAV time. However, the real situation is that: since the target Communication device A does not successfully receive the CTS frame, the target communication device A will think that the RTS/CTS mechanism fails to be established, that is, it will not transmit data to the wireless access point AP. At this time, in a case that the wireless access point AP does not receive a PHY-RXSTART. indication primitive within an aSIFSTime+aSlotTime+aRxPHYStartDelay time, the wireless access point AP can determine that the RTS/CTS mechanism fails to be established, and then the wireless access point AP can communicate with other non-target communication devices, for example, the wireless access point AP transmits the MAC frame to the communication device C. At this time, in a case that the transmitter address and the receiver address of the MAC frame received by the communication device C satisfy the establishment failure condition for the RTS/CTS mechanism which is preset, the network allocation vector is reset to avoid unnecessary waiting time.

In the embodiment of the present disclosure, in the case that the receiving situation is that only the CTS frame is received and the CTS frame is a CTS frame transmitted by the wireless access point to the target communication device, that is, the receiving situation satisfies the pre-reset condition which is preset, the MAC frame received within the network allocation vector time is acquired; and in the case that the transmitter address and the receiver address of the MAC frame satisfy the establishment failure condition for the RTS/CTS mechanism which is preset, the network allocation vector is reset. It can be understood that, even if the Duration carried by the current MAC frame is less than its current NAV value, the network allocation vector can be reset, that is, the own NAV is set according to the currently received MAC frame. It should be noted that the NAV value will continue to decrease over time, therefore, the current NAV value refers to an NAV value in a case that the MAC frame is received.

(4) Only the CTS frame is received, and the receiver address of the CTS frame is the wireless access point.

At this time, the communication device only receives the CTS frame, and the receiver address of the CTS frame is the wireless access point, but the communication device does not know the transmitter address of the MAC frame. At this time, regardless of receiving the frame transmitted by the wireless access point or the frame transmitted to the wireless access point, the communication device maintains the network allocation vector unchanged.

In the embodiment of the present disclosure, in a case that the receiving situation is that only the CTS frame is received and the receiver address of the CTS frame is the wireless access point, that is, in a case that the receiving situation does not satisfy the pre-reset condition, the network allocation vector is maintained unchanged.

Specifically, the MAC frame includes one of the following: a data frame, a control frame, and a management frame.

It should be noted that, in the embodiment of the present disclosure, it is not necessary to limit the specific type of the MAC frame, and it is only necessary to determine whether the RTS/CTS mechanism is successfully established by means of the transmitter address and the receiver address of the MAC frame.

Specifically, the establishment failure condition for the RTS/CTS mechanism is: the transmitter address is the wireless access point, and the receiver address is not the target communication device. In other words, the establishment failure condition for the RTS/CTS mechanism is: the transmitter address is an address of the wireless access point, and the receiver address is not an address of the target communication device.

In the embodiment of the present disclosure, the establishment failure condition for the RTS/CTS mechanism is judged on the basis of the MAC frame, which is received by the communication device and transmitted by the wireless access point. On one hand, in a case that the RTS/CTS mechanism is successfully established, the wireless access point will absolutely not transmit the MAC frame to the communication device, and on the other hand, in the infrastructure BSS, the target communication device can only communicate with the wireless access point. Therefore, in a case that the RTS/CTS mechanism fails to be established, the target communication device will not transmit the frame to the communication device other than the wireless access point. It can be understood that, in the embodiment of the present disclosure, whether the RTS/CTS mechanism is successfully established is judged according to whether the wireless access point transmits the frame to the communication device instead of according to whether the wireless access point transmits the frame to the target communication device. This is because even if the wireless access point transmits the frame to the target communication device, for example, replies the CTS frame, but the target communication device does not successfully analyze the CTS frame due to other interference, the RTS/CTS mechanism is not successfully established at this time, therefore whether the RTS/CTS mechanism is successfully established cannot be judged according to whether the wireless access point transmits the frame to the target communication device.

In the method for adjusting the network allocation vector of the communication device provided by the embodiment of the present disclosure, the own network allocation vector of the communication device is adjusted according to the receiving situation of the received RTS frame or the CTS frame, and the transmitter address and the receiver address of the received MAC frame, so as not to miss the opportunity to compete for the channel and avoid unnecessary waiting time. Therefore, by means of the embodiment of the present disclosure, the own network allocation vector can be adjusted reasonably and effectively, such that the communication device can compete for the channel more effectively, thereby improving the network throughput.

Figure 5:
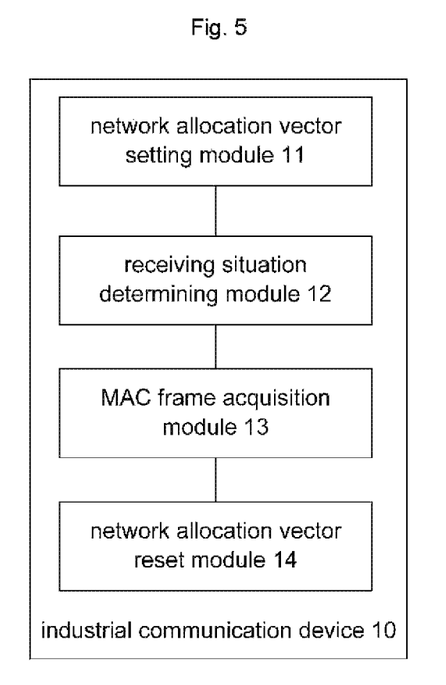
FIG. 5 is a structural block diagram of a communication device provided by an embodiment of the present disclosure.

Referring to FIG. 5, FIG. 5 is a structural block diagram of a communication device 10 provided by an embodiment of the present disclosure. The communication device 10 includes:

a network allocation vector setting module 11 configured to, after receiving an RTS frame or a CTS frame transmitted in a case that a target communication device establishes an RTS/CTS mechanism with a wireless access point, set a network allocation vector according to the RTS frame or the CTS frame;

a receiving situation determining module 12, configured to determine a receiving situation of the RTS frame or the CTS frame;

an MAC frame acquisition module 13 configured to, in a case that the receiving situation satisfies a pre-reset condition which is preset, acquire an MAC frame received within network allocation vector time; and a network allocation vector reset module 14 configured to, in a case that a transmitter address and a receiver address of the MAC frame satisfy an establishment failure condition for the RTS/CTS mechanism which is preset, reset the network allocation vector.

In another preferred embodiment, the communication device further includes:

a network allocation vector maintaining module configured to, in a case that the receiving situation does not satisfy the pre-reset condition, maintain the network allocation vector unchanged.

Preferably, the pre-reset condition includes one of the following:

the RTS frame is received, and the RTS frame is an RTS frame transmitted by the target communication device to the wireless access point;

the RTS frame is received, and the RTS frame is an RTS frame transmitted by the wireless access point to the target communication device; and only the CTS frame is received, and the CTS frame is a CTS frame transmitted by the wireless access point to the target communication device.

Preferably, the MAC frame includes one of the following: a data frame, a control frame, and a management frame.

Preferably, the establishment failure condition for the RTS/CTS mechanism is: the transmitter address is the wireless access point, and the receiver address is not the target communication device.

It is worth noting that, for the working process of each module in the communication device 10 according to the embodiment of the present disclosure, reference can be made to the working process of the network allocation vector adjustment method for the communication device described in the above embodiment, and thus no repeated description will be given herein.

In the communication device 10 provided by the embodiment of the present disclosure, the own network allocation vector of the communication device is adjusted according to the receiving situation of the received RTS frame or the CTS frame, and the transmitter address and the receiver address of the received MAC frame, so as not to miss the opportunity to compete for the channel and avoid unnecessary waiting time. Therefore, by means of the embodiment of the present disclosure, the own network allocation vector can be adjusted reasonably and effectively, such that the communication device can compete for the channel more effectively, thereby improving the network throughput.

Figure 6:
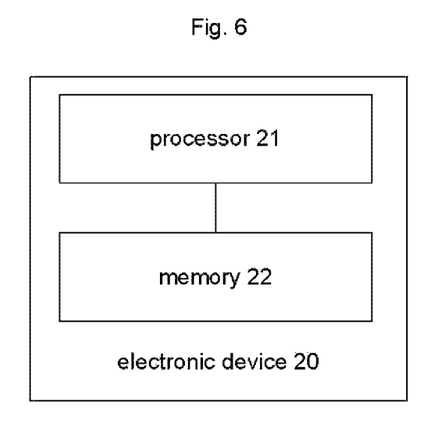
FIG. 6 is a structural block diagram of an electronic device provided by an embodiment of the present disclosure.

Referring to FIG. 6, FIG. 6 is a structural block diagram of an electronic device 20 provided by an embodiment of the present disclosure. The electronic device 20 includes a processor 21, a memory 22, and a computer program that is stored in the memory 22 and is capable of running on the processor 21. In a case that executing the computer program, the processor 21 implements the steps in the embodiment of method for adjusting the network allocation vector of the communication device. Or, in a case that executing the computer program, the processor 21 implements the functions of the modules/units in the embodiment of the communication device.

Exemplarily, the computer program can be divided into one or more modules/units, and the one or more modules/units are stored in the memory 22 and are executed by the processor 21, so as to complete the present disclosure. The one or more modules/units can be a series of computer program instruction segments that are capable of completing specific functions, and the instruction segments are used for describing an execution process of the computer program in the electronic device 20.

The electronic device 20 can be a computing device such as a desktop computer, a notebook computer, a palmtop computer, and a cloud server. The electronic device 20 can include, but is not limited to, a processor 21 and a memory 22. Those skilled in the art can understand that the schematic diagram is only an example of the electronic device 20, but does not constitute a limitation to the electronic device 20, and can include more or less components than those shown, or some components are combined, or different components, for example, the electronic device 20 can also include an input and output device, a network access device, a bus, and the like.

The so-called processor 21 can be a central processing unit (Central Processing Unit, CPU), or other general-purpose processors, a digital signal processor (Digital Signal Processor, DSP), an application specific integrated circuit (Application Specific Integrated Circuit, ASIC), a field-programmable gate array (Field-Programmable Gate Array, FPGA) or other programmable logic devices, a discrete gate or transistor logic device, a discrete hardware component, etc. The general-purpose processor can be a microprocessor or the processor can also be any conventional processor, etc. The processor 21 is a control center of the electronic device 20, and various portions of the entire electronic device 20 are conned by using various interfaces and lines.

The memory 22 can be used for storing the computer programs and/or modules, and the processor 21 implements various functions of the electronic device 20 by means of running or executing the computer programs and/or modules stored in the memory 22 and calling the data stored in the memory 22. The memory 22 can mainly include a program storage area and a data storage area, and the program storage area can store an operating system, and an application program required for at least one function (such as a sound playing function and an image playing function); and the data storage area can store data (such as audio data and phonebook) created according to the use of a mobile phone, and the like. In addition, the memory 22 can include a high-speed random access memory, and can also include a non-volatile memory, such as a hard disk, an internal memory, a plug-in hard disk, a smart media card (Smart Media Card, SMC), a secure digital (Secure Digital, SD) card, a flash card (Flash Card), at least one magnetic disk storage device, a flash memory device, or other volatile solid state storage devices.

If the modules/units integrated in the electronic device 20 are implemented in the form of software functional units and are sold or used as independent products, they can be stored in a computer-readable storage medium. Based on this understanding, all or part of the processes in the method of the above embodiment can be implemented by the present disclosure, and can also are completed by instructing relevant hardware by means of a computer program, the computer program can be stored in a computer-readable storage medium, and in a case that executed by the processor 21, the computer program can implement the steps of the foregoing method embodiments. The computer program includes computer program codes, and the computer program codes can be in the form of source codes, object codes, executable files or some intermediate forms, etc. The computer-readable medium can include: any entity or apparatus that is capable of carrying the computer program codes, a recording medium, a USB flash disk, a removable hard disk, a magnetic disk, an optical disk, a computer memory, a read-only memory (ROM, Read-Only Memory), a random access memory (RAM, Random Access Memory), an electric carrier signal, a telecommunication signal, a software allocation medium, etc.

It should be noted that the apparatus embodiments described above are only schematic, and the units described as separate components can be separated physically or not, components displayed as units can be physical units or not, namely, can be located in one place, or can also be distributed on a plurality of network units. A part or all modules can be selected to implement the purposes of the solutions in the present embodiment according to actual demands. In addition, in the drawings of the apparatus embodiments provided by the present disclosure, the connection relationship between the modules indicates that there is a communication connection therebetween, which can be specifically implemented as one or more communication buses or signal lines. Those of ordinary skill in the art can understand and implement it without any creative effort.

Figure 7:
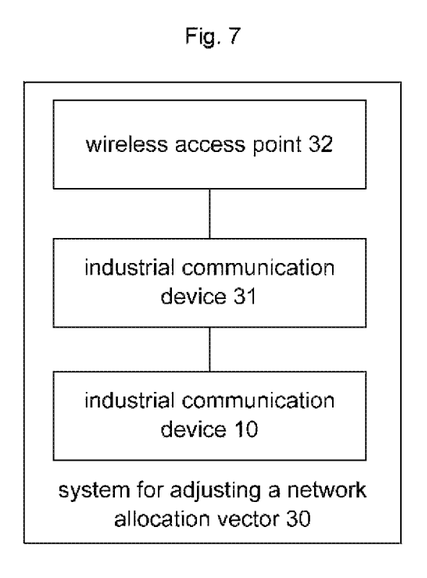
FIG. 7 is a structural block diagram of a system for adjusting a network allocation vector provided by an embodiment of the present disclosure.

Referring to FIG. 7, FIG. 7 is a structural block diagram of a system for adjusting a network allocation vector 30 provided by an embodiment of the present disclosure. The system for adjusting the network allocation vector 30 includes: at least two communication devices 31 and a wireless access point 32, and there is at least one above communication device 10 in the at least two communication devices.

For the specific working process of the communication device 10, reference can be made to the working process of the communication device 10 described in the above embodiment, and thus no repeated description will be given herein.

In the system for adjusting the network allocation vector 30 provided by the embodiment of the present disclosure, the own network allocation vector of the communication device is adjusted according to the receiving situation of the received RTS frame or the CTS frame, and the transmitter address and the receiver address of the received MAC frame, so as not to miss the opportunity to compete for the channel and avoid unnecessary waiting time. Therefore, by means of the embodiment of the present disclosure, the own network allocation vector can be adjusted reasonably and effectively, such that the communication device can compete for the channel more effectively, thereby improving the network throughput.

The above descriptions are preferred embodiments of the present disclosure. It should be pointed out that, for those of ordinary skill in the art, several improvements and modifications can be made without departing from the principles of the present disclosure, and these improvements and modifications can also be regarded as the protection scope of the present disclosure.

What is claimed is:

1. A method for adjusting a network allocation vector of a communication device, comprising:
    after receiving an RTS frame or a CTS frame transmitted in a case that a wireless access point establishes an RTS/CTS mechanism with a target communication device correspondingly, setting the network allocation vector according to the RTS frame or the CTS frame;
    determining a receiving situation of the RTS frame or the CTS frame;
    in a case that the receiving situation satisfies a pre-reset condition which is preset, acquiring an MAC frame received within network allocation vector time; and
    in a case that a transmitter address and a receiver address of the MAC frame satisfy an establishment failure condition for the RTS/CTS mechanism which is preset, resetting the network allocation vector,
    wherein the pre-reset condition comprises one of the following:
    the RTS frame is received, and the RTS frame is an RTS frame transmitted by the target communication device to the wireless access point;
    the RTS frame is received, and the RTS frame is an RTS frame transmitted by the wireless access point to the target communication device; and
    only the CTS frame is received, and the CTS frame is a CTS frame transmitted by the wireless access point to the target communication device,
    the establishment failure condition for the RTS/CTS mechanism is: the transmitter address is the wireless access point, and the receiver address is not the target communication device.

2. The method for adjusting the network allocation vector of the communication device according to claim 1, wherein the method further comprises:
    in a case that the receiving situation does not satisfy the pre-reset condition, maintaining the network allocation vector unchanged.

3. The method for adjusting the network allocation vector of the communication device according to claim 1, wherein the MAC frame comprises one of the following: a data frame, a control frame, and a management frame.

4. A communication device, comprising:
    a network allocation vector setting module, configured to, after receiving an RTS frame or a CTS frame transmitted in a case that a target communication device establishes an RTS/CTS mechanism with a wireless access point, set a network allocation vector according to the RTS frame or the CTS frame;
    a receiving situation determining module, configured to determine a receiving situation of the RTS frame or the CTS frame;
    an MAC frame acquisition module, configured to, in a case that the receiving situation satisfies a pre-reset condition which is preset, acquire an MAC frame received within network allocation vector time; and
    a network allocation vector reset module, configured to, in a case that a transmitter address and a receiver address of the MAC frame satisfy an establishment failure condition for the RTS/CTS mechanism which is preset, reset the network allocation vector,
    wherein the pre-reset condition comprises one of the following:
    the RTS frame is received, and the RTS frame is an RTS frame transmitted by the target communication device to the wireless access point;
    the RTS frame is received, and the RTS frame is an RTS frame transmitted by the wireless access point to the target communication device; and
    only the CTS frame is received, and the CTS frame is a CTS frame transmitted by the wireless access point to the target communication device,
    the establishment failure condition for the RTS/CTS mechanism is: the transmitter address is the wireless access point, and the receiver address is not the target communication device.

5. An electronic device, comprising a processor, a memory, and a computer program that is stored in the memory and is configured to be executed by the processor, wherein in a case that executing the computer program, the processor implements a method for adjusting a network allocation vector of an communication device, the method comprises:
after receiving an RTS frame or a CTS frame transmitted in a case that a wireless access point establishes an RTS/CTS mechanism with a target communication device correspondingly, setting the network allocation vector according to the RTS frame or the CTS frame;
determining a receiving situation of the RTS frame or the CTS frame;
in a case that the receiving situation satisfies a pre-reset condition which is preset, acquiring an MAC frame received within network allocation vector time; and
in a case that a transmitter address and a receiver address of the MAC frame satisfy an establishment failure condition for the RTS/CTS mechanism which is preset, resetting the network allocation vector,
wherein the pre-reset condition comprises one of the following:
the RTS frame is received, and the RTS frame is an RTS frame transmitted by the target communication device to the wireless access point;
the RTS frame is received, and the RTS frame is an RTS frame transmitted by the wireless access point to the target communication device; and
only the CTS frame is received, and the CTS frame is a CTS frame transmitted by the wireless access point to the target communication device,
the establishment failure condition for the RTS/CTS mechanism is: the transmitter address is the wireless access point and the receiver address is not the target communication device.

6. A system for adjusting a network allocation vector, comprising: at least two communication devices and a wireless access point, wherein there is at least one of the communication device according to claim 4 in the at least two communication devices.

7. The communication device according to claim 4, wherein the communication device further comprise:
a network allocation vector maintaining module, configured to, in a case that the receiving situation does not satisfy the pre-reset condition, maintain the network allocation vector unchanged.

8. The communication device according to claim 4, wherein the MAC frame comprises one of the following: a data frame, a control frame, and a management frame.

9. The electronic device according to claim 5, wherein the establishment failure condition for the RTS/CTS mechanism is: the transmitter address is the wireless access point, and the receiver address is not the target communication device.

10. The electronic device according to claim 5, wherein the method further comprises:
in a case that the receiving situation does not satisfy the pre-reset condition, maintaining the network allocation vector unchanged.

11. The electronic device according to claim 5, wherein the MAC frame comprises one of the following: a data frame, a control frame, and a management frame.

* * * * *